United States Patent [19]

Divens

[11] Patent Number: 5,729,206
[45] Date of Patent: Mar. 17, 1998

[54] GROUND WATER ALERT DEVICE

[76] Inventor: Gary H. Divens, 11650 Moonridge Dr., Whittier, Calif. 90601

[21] Appl. No.: 784,047

[22] Filed: Jan. 17, 1997

Related U.S. Application Data

[60] Provisional application No. 60/010,206, Jan. 18, 196.

[51] Int. Cl.$^6$ .................................................. G08B 21/00
[52] U.S. Cl. ........................ 340/618; 340/620; 73/304 R
[58] Field of Search .................................... 340/618, 620, 340/623, 624, 693; 73/304 R, 305, 307, 308, 313, 314

[56] References Cited

U.S. PATENT DOCUMENTS

| | | | |
|---|---|---|---|
| 3,935,741 | 2/1976 | Zinsmeyer et al. | 340/624 |
| 4,459,584 | 7/1984 | Clarkson | 340/618 |
| 4,571,998 | 2/1986 | Stegner | 340/624 |
| 4,804,944 | 2/1989 | Golladay et al. | 340/624 |

*Primary Examiner*—Jeffery Hofsass
*Assistant Examiner*—Daniel J. Wu
*Attorney, Agent, or Firm*—David & Raymond; Raymond Y. C. Chan

[57] ABSTRACT

A ground water alert device includes an elongated water proof cable member which has a predetermined length and is inserted into a water level monitoring pipe of a well for a predetermined depth above a water table, a cable housing for delivering and collecting the cable member, a water sensor such as a probe which is electrically connected to a free end of the cable member for lowering into the monitoring pipe to the predetermined depth above the water table, a DC power source, a control circuitry electrically connected between the DC power source and the cable member for generating alert signals when the water sensor detects water, a depth indicator having a plurality of length scales uniformly provided along the cable member to indicate the length of the cable member from the water sensor, and a cable supporter for securing the cable member in place at a top end of the monitoring pipe so as to ensure the predetermined length of the cable member retaining in the monitoring pipe. The control circuitry comprises a function switch for electrically connecting with an alarm box by an alarm cable. The alarm box comprises at least an alarm signal device which would be activated to generate an alarm signal when the alarm box detects an electrical short while the water comes in contact with the water sensor or the water table rises to a predetermined safety level for any reason.

20 Claims, 3 Drawing Sheets

# GROUND WATER ALERT DEVICE

BACKGROUND OF THE PRESENT INVENTION

This is a regular application of a provisional application, application Ser. No. 60/010,206, filing date Jan. 18, 1996. The present invention relates to an alert system, and more particularly to a ground water alert device which is a water level management device for detecting the ground water level and providing alert signal when the predetermined safety ground water level is breached.

Every year, especially those hill top community, we have a rainy season with predictable landslides and property damage. People may notice the threat from above ground, but the threat from below the ground is invisible. In trouble areas, water seeps in from natural and man made sources and destabilizes the ground. The effects of destabilization cost homeowners, developers and insurance agencies millions of dollars every year. In fact, the landslide is not caused by heavy rain falls alone. A high water table in conjunction with heavy rain falls would cause the landslide.

Monitoring wells and pumping wells help to control the situation, but there is no way to give effective advance warning if a problem occurs. We don't know how high the water will get in a monitoring well before it is discovered too high. In most cases, hundred thousand gallons of ground water may seep into a community and cause serious damages before people are aware.

Practically, the pumps could fail or a power outage could happen. In such situations, more water than expected could enter the system and a number of problems could arise. However, a pump and dewatering company can only provide an inspector to monitor the pump near a house. The conventional detecting method for an inspector is to simply bend down and listen for the hum of the pump. In other words, the pump and dewatering company do not provide any alert system. Moreover, it is unable to set an alert zone. The pump would pump the water to the bottom of the well. The pump would turn off and cycle back on at a time set by the pump contractor. The water may rise too high between cycles. This may occur when there is an increase of flow water.

SUMMARY OF THE PRESENT INVENTION

It is a main object of the present invention to provide a ground water alert device installed in a well, which can provide alert signal to give advance warning for timely response if the water table rises to a predetermined safety level for any reason.

It is another object of the present invention to provide a ground water alert device which can be equipped with an automatic telephone dialer and/or a standard alarm system to provide warning signal, such as warning lighting or buzzing sound.

It is yet another object of the present invention to provide a ground water alert device which can be set at a rate to permit an alert zone.

It is yet another object of the present invention to provide a ground water alert device which can collect and receive information of the ground water level during operation.

It is still another object of the present invention to provide a ground water alert device which can determine the water levels.

It is still another object of the present invention to provide a ground water alert device which is a portable water level management device and can be used as a portable water level meter.

Accordingly, the present invention provides a ground water alert device which comprises an elongated waterproof cable member which has a predetermined length and is inserted into a water level monitoring pipe of a well for a predetermined depth above a water table, a cable housing for delivering and collecting the cable member, a water sensor such as a probe which is electrically connected to a free end of the cable member for lowering into the monitoring pipe to the predetermined depth above the water table, a DC power source, a control circuitry electrically connected between the DC power source and the cable member for generating alert signals when the water sensor detects water, a depth indicator having a plurality of length scales uniformly provided along the cable member to indicate the length of the cable member from the water sensor, and a cable supporter for securing the cable member in place at a top end of the monitoring pipe so as to ensure the predetermined length of the cable member retaining in the monitoring pipe.

The control circuitry comprises a function switch for electrically connecting with an alarm box by an alarm cable. The alarm box comprises at least an alarm signal device which would be activated to generate an alarm signal when the alarm box detects an electrical short while the water comes in contact with the water sensor.

DETAILED DESCRIPTION OF THE PREFERRED EMBODIMENT

Figure 1:
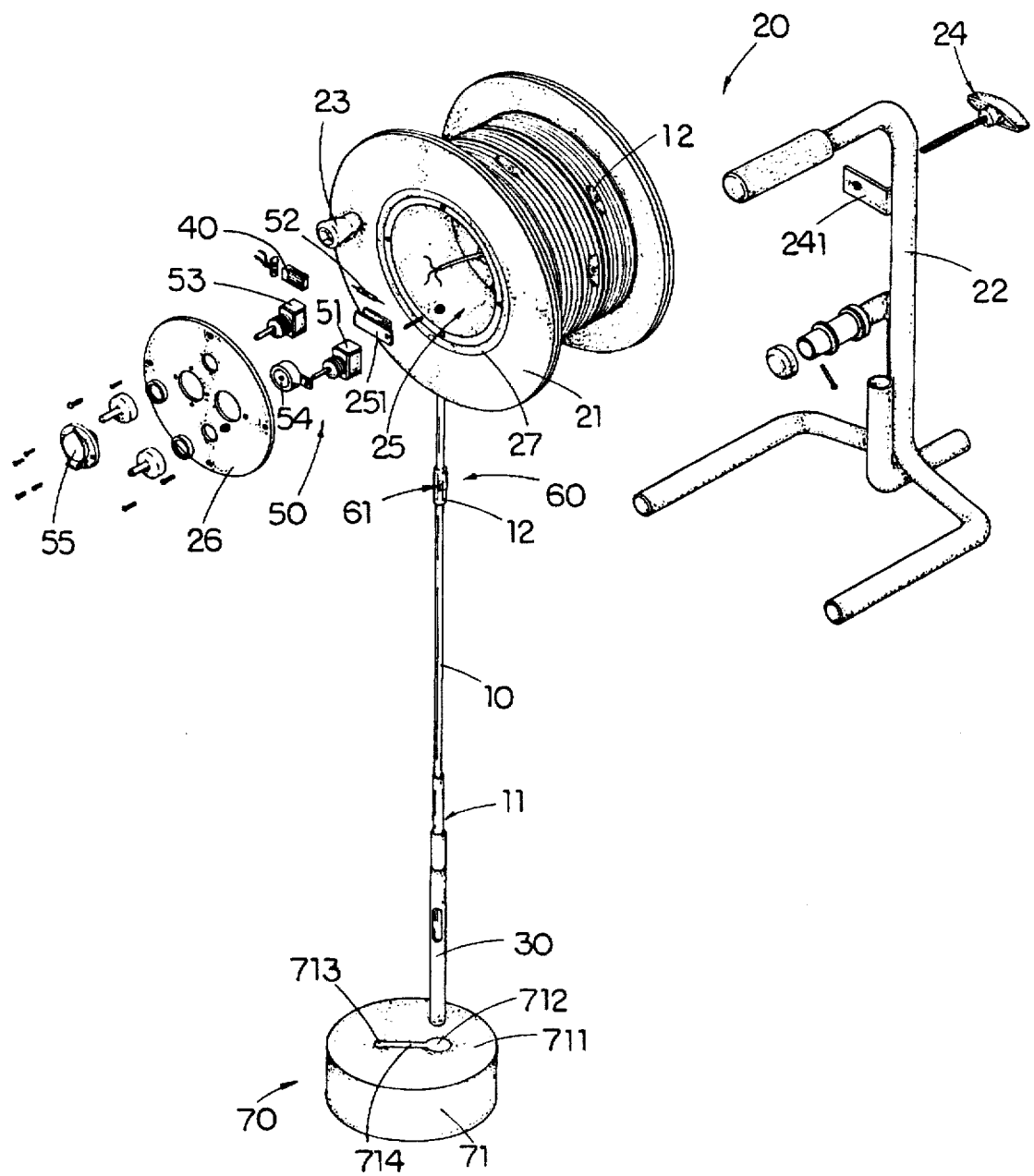
FIG. 1 is a partially exploded perspective view of a ground water alert device according to a preferred embodiment of the present invention.
Figure 2:
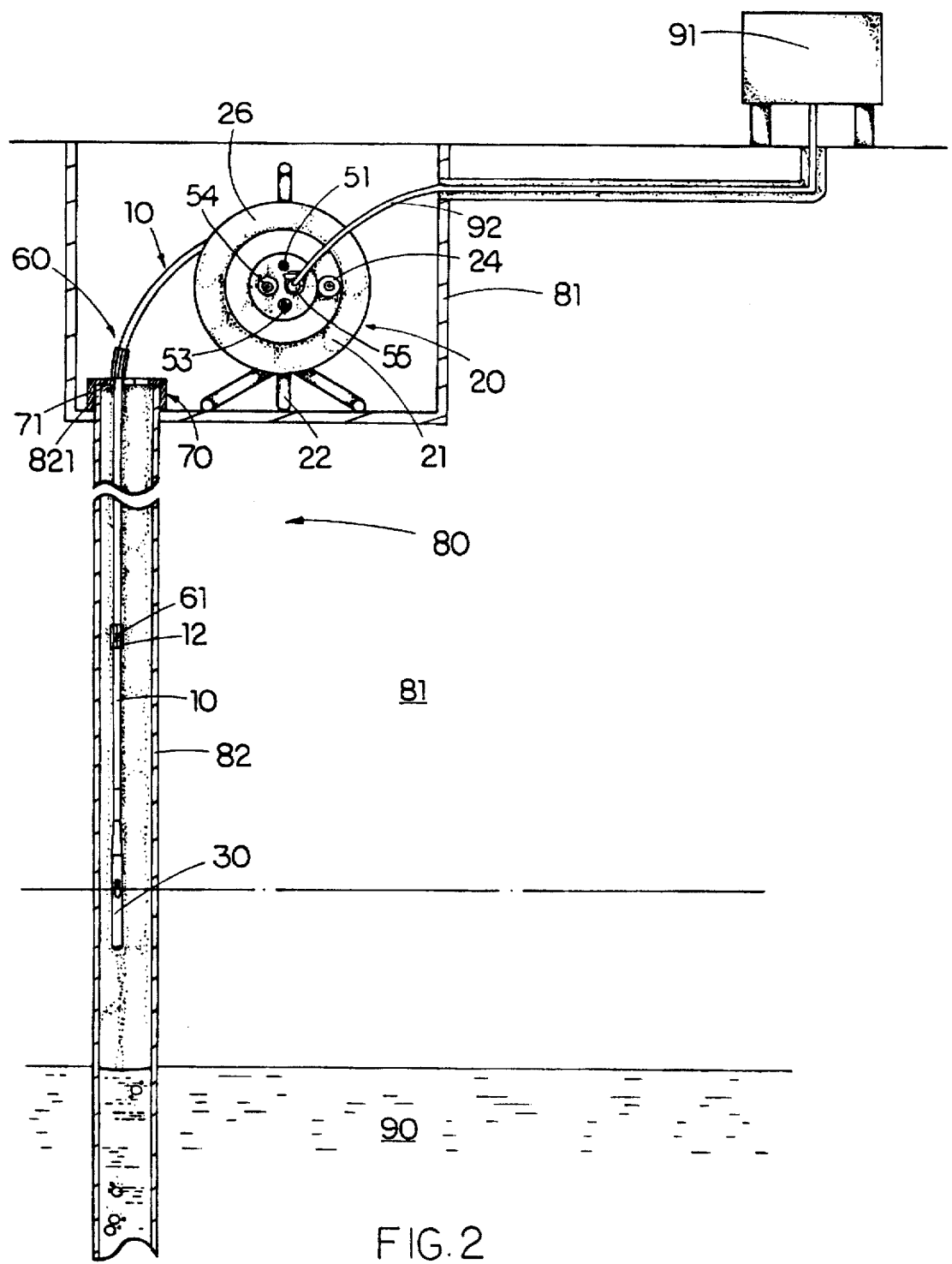
FIG. 2 is a partially sectional view of the ground water alert device installed to a monitoring well according to the above preferred embodiment of the present invention.

Referring to FIGS. 1 and 2, a ground water alert device of the present invention which is installed in a well vault 81 of a well 80 (as shown in FIG. 2) and comprises an elongated waterproof cable member 10 which has a predetermined length and is inserted into a water level monitoring pipe 82 of the well 80 for a predetermined depth above a water table 90, a cable housing 20 for delivering and collecting the cable member 10, a water sensor 30 such as a probe which is electrically connected to a free end 11 of the cable member 10 for lowering into the monitoring pipe 82 to the predetermined depth above the water table 90, a DC power source 40, a control circuitry 50 electrically connected between the DC power source 40 and the cable member 10 for generating alert signals when the water sensor 30 detects water, a depth indicator 60 having a plurality of length scales 61 uniformly provided along the cable member 10 to indicate the length of the cable member 10 from the water sensor 30, and a cable supporter 70 for securing the cable member 10 in place at a top end 821 of the monitoring pipe 82 so as to ensure the predetermined length of the cable member 10 retaining in the monitoring pipe 82.

Since the wells 80 vary in depth, the cable member 10 must be made of strong material. Therefore, the cable member 10 comprises two conductors shielded with Teflon as exterior shell. Of course, other strong cables would also be suffice. According to the present embodiment, the cable member 10 has a length of 150 feet. The water sensor 30, i.e.

a probe, is electrically connected to the free end 11. The cable member 10 further comprises a plurality of enlarged stoppers 12 uniformly affixed along the length of the cable member 10 in evenly spaced manner. In accordance with the present embodiment, the distance between every two stoppers 12 is set to be 10 feet. The length scales 61, for example "10 feet", "20 feet", "30 feet", etc., of the depth indicator 60 are disposed on the stoppers 12 respectively in order to indicate the actual length of the cable member 10, in which the scale 61 with smaller scale is positioned at a lower position of the cable member 10 and then increases gradually.

The cable housing 20 comprises a reel 21 rotatably mounted on a portable stand 22 which is placed in the well vault 81. An upper end of the cable member 10 is affixed on the reel 21. A handle 23 is affixed on the reel 21 adapted for turning the reel 21 in anti-clockwise direction to deliver the cable member 10 gradually and in clockwise direction to collect the cable member 10 to wind on the reel 21. A reel stopper 24 is provided on the stand 22 adapted to press on the reel 21 for securing the reel 21 to prevent any rotation by screwing in through a stopper frame 241 affixed on the stand 22. The reel 21 further has a receiving chamber 25 provided therein for receiving the DC power source 40 and the control circuitry 50 in place. A cover plate 26 is secured on the reel 21 to sealedly cover the receiving chamber 25. A gasket 27 is positioned between the cover plate 26 and the front surface of the reel 21 to ensure sealed connection. The DC power source 40 is a 9V battery. Within the receiving chamber 25, a battery holder 251 to electrically connect and hold the DC power source 40 in position.

The cable supporter 70 comprises a stop cap 71 having an U-shaped cross section. The stop cap 70 fits over the top end 821 of the monitoring pipe 82 which is installed in the well 80 to check the water level of the water table 90. On a top surface 711 of the stop cap 70 has an inlet hole 712 having a diameter larger than the diameter of the enlarged stopper 12 and the diameter the water sensor 30, a stopping hole 713 having a diameter larger than the cable member 10 and smaller than the diameter of the enlarged stopper 12, and a slit 714 which has a width slightly larger than the diameter of the cable member 10 extending between the inlet hole 712 and the stopping hole 713. Therefore, the cable member 10 can be inserted into the monitoring pipe 82 through the inlet hole 712. Until a desired length of the cable member 10 is lowered into the monitoring pipe 82, the user may slid the cable member 10 to the stopping hole 713 via the slit 714. Since the stopper 12 has a diameter larger than the stopping hole 713, a proximate stopper 12 of the cable member 10 can be rested and secured in place by the stopping hole 713, so that the desired length of cable member 10 inserting into the monitoring pipe 82 is secured and ensured, as shown in FIG. 2.

According to the present embodiment the stopper cap 71 not only has the functions of supporting the cable member 10 hanging in the monitoring pipe 82 and securing the cable member 10 in place, but also can provide a covering protection to the monitoring pipe 82 to avoid unwanted objects fallen into the monitoring pipe 82.

Figure 3:
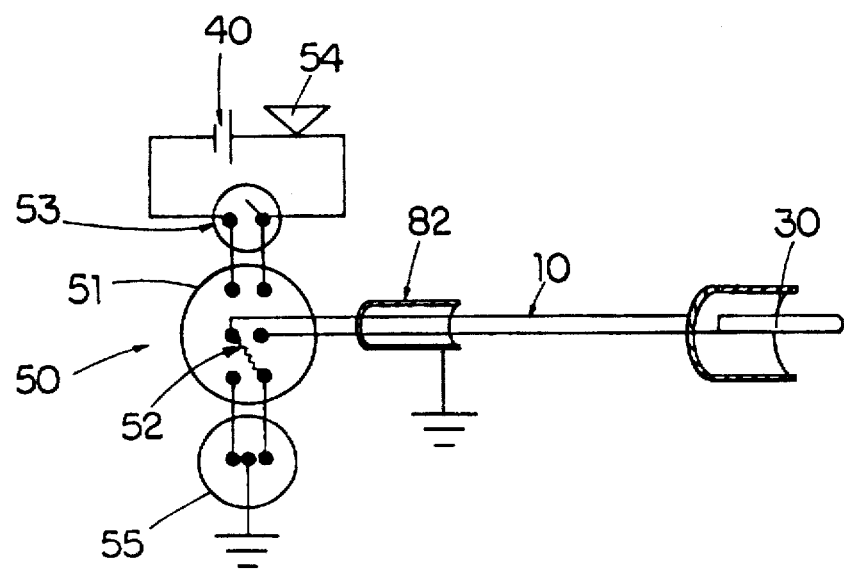
FIG. 3 is a circuit diagram of a control circuitry of the ground water alert device according to the preferred embodiment of the present invention.

As shown in FIG. 2, the ground water alert device further comprises an alarm box 91, in usual manner, and an alarm cable 92. As shown in FIGS. 1 and 3, the control circuitry 50 comprises a function switch 51 for electrically connecting with the alarm box 91 by the alarm cable 92. The function switch 51 has a test position, a off position and a monitor position. The alarm box 91 comprises at least an alarm signal device which would be activated to generate an alarm signal when the alarm box 91 detects an electrical short during the water in contact with the water sensor 30. The function switch 51 of the control circuitry 50 further comprises a 2.2k resistor 52 electrically connected. The monitor position places the 2.2k resistor 52 in a parallel circuit with the water sensor 30, as shown in FIG. 3. Setting the alarm causes a low level current to flow. The low level current travels through the alarm cable 92, the 2.2k resistor 52, and back to the alarm box 91 to form a circuit. The alarm box 91 constantly monitors the circuit for the 2.2k resistance of the resistor 52. The alarm signal device of the alarm box 91 will be activated if the 2.2k resistance of the resistor 52 is not detected. A break in the alarm cable 92 will active the alarm signal device of the alarm box 91 to generate alarm signal. The function switch 51 being not set to the monitor position will also activate the alarm signal device of the alarm box 91.

As shown in FIGS. 1 and 3, the control circuitry 50 further comprises a buzzer switch 53 electrically connected to the function switch 51, a buzzer 54 connected in series with the buzzer switch 53 and the DC power source 40, a telephone socket 55 electrically connected with the function switch 51 for enabling the alarm cable 92 connected thereto.

To install the ground water alert device of the present invention in the well vault 81, the following procedures should be processed.

(1) Place the stop cap 71 over the top end 821 of the monitoring pipe 82.

(2) Check the battery 40 (DC power source) by switching the buzzer switch 53. The buzzer 54 would sound if the battery 40 is normal.

(3) Switch the function switch 51 to the test position.

(4) Release the real stopper 24 by turning anti-clockwise for delivering the cable member 10.

(5) Lower the probe 30 (water sensor) through the inlet hole 712 of the stop cap 71 and down into the well 81 through the monitoring pipe 82. The buzzer 54 will sound when the probe 30 touches water of the water table 90. The probe 30 is raised to a desired level above the water table 90, i.e. the alarm zone, as shown by the dotted line in FIG. 2.

(6) Slid the cable member 10 to the stopping hole 713 on the stop cap 71 through the slit 714. The cable stop 71 would secure the cable member 10 in place.

(7) Lock the real stopper 24 by screwing it toward the reel 21 in clockwise direction.

(8) Set the function switch 51 to the monitor position.

(9) Plug the alarm cable 92 into the telephone socket 55.

(10) Place the reel 21 inside the well vault 81.

The presence of the buzzer switch 53 and the buzzer 54 enable the device to generate sound when the probe 30 is in contact with water, so that a separate depth finding instrument can be eliminated. The buzzer 54 is operated by the battery 40. The buzzer switch 53 can be used to check the function of the battery 40 also. It is worth to mention that the whole ground water alert device of the present invention must be water proof since it is preferred to be stationary used in the well vault 81. The ground water alert device of the present invention, in fact, is a water level management device. The user must determine an alert zone which is necessary for the proper operation of the device. Practically, the pumps would pump the water to the bottom of the well and would turn off, cycle back on at a time set by the pump contractor. The water rose too high between cycles. Therefore, the user may consult with the pump contractor to test the pump rates. Then, the pump cycles can then be set at a rate that would not breach the alert zone.

Accordingly, the ground water alert device of the present invention can achieve various advantages as follows:

The ground water alert device can provide alert signal to give advance warning for timely response if the water table rises to a predetermined safety level for any reason. It can be equipped with an automatic telephone dialer and/or a standard alarm system to provide warning signal, such as warning lighting or buzzing sound. Moreover, it can be set at a rate to permit an alert zone.

Besides the ground water alert device of the present invention can collect and received information of the ground water level during operation. It can be used to determine the water levels. Practically, the ground water alert device of the present invention is a portable water level management device and can be used as a portable water level meter.

I claim:

1. A ground water alert device, comprising
   an elongated water proof cable member which has a predetermined length and is inserted into a water level monitoring pipe of a well for a predetermined depth above a water table;
   a cable housing for delivering and collecting said cable member;
   a water sensor which is electrically connected to a free end of said cable member for lowering into said monitoring pipe to said predetermined depth above said water table; a depth indicator having a plurality of length scales uniformly provided along said cable member to indicate a length of said cable member from said water sensor;
   a cable supporter for securing said cable member in place at a top end of said monitoring pipe so as to ensure said predetermined length of said cable member retaining in said monitoring pipe; and
   a control circuitry for generating alert signals when said water sensor detects water, in which said control circuitry comprises a function switch for electrically connecting with said cable member and a telephone socket electrically connected with said function switch for selectively connecting with an alarm box by an alarm cable, so that said alarm box is activated to generate an alarm signal when said alarm box detects an electrical short during said water sensor being in contact with water, said function switch comprising a resistor electrically connected between said cable member and said telephone socket, wherein when said function switch is positioned at a monitor position, said resistor is placed in a parallel circuit with said water sensor, so that a low level current is set to flow through said alarm cable, said resistor, and back to said alarm box to form a circuit which is constantly monitored by said alarm box for a resistance of said resistor, and that said alarm box is activated when said resistance of said resistor is not detected, so that a break in said alarm cable activates said alarm box to generate said alarm signal, moreover when said function switch is not set to said monitor position, said alarm box is also activated to provide said alarm signal.

2. A ground water alert device, as recited in claim 1, in which said water sensor is a probe electrically connected to said free end of said cable member.

3. A ground water alert device, as recited in claim 2, in which said cable member comprises a plurality of enlarged stoppers uniformly provided along said length of said cable member in evenly spaced manner.

4. A ground water alert device, as recited in claim 3, in which said plurality of scale of said depth indicator are disposed on said stoppers respectively in order to indicate a actual length of said cable member.

5. A ground water alert device, as recited in claim 1, in which said cable housing comprises a reel rotatably mounted on a portable stand which is placed in a well vault, an upper end of said cable member being affixed on said reel, a handle being affixed on said reel adapted for turning said reel to deliver said cable member gradually and to collect said cable member to wind on said reel, said reel further having a receiving chamber provided therein for receiving said DC power source and said control circuitry in place.

6. A ground water alert device, as recited in claim 5, in which said cable housing further comprises a cover plate secured on said reel to sealedly cover said receiving chamber, a gasket being positioned between said cover plate and said front surface of said reel to ensure sealed connection.

7. A ground water alert device, as recited in claim 6, in which said reel further comprises a reel stopper which is provided on said stand adapted to press on said reel for securing said reel to prevent any rotation by screwing in through a stopper frame affixed on said stand.

8. A ground water alert device, as recited in claim 4, in which said cable housing comprises a reel rotatably mounted on a portable stand which is placed in a well vault, an upper end of said cable member being affixed on said reel, a handle being affixed on said reel adapted for turning said reel to deliver said cable member gradually and to collect said cable member to wind on said reel, said reel further having a receiving chamber provided therein for receiving said DC power source and said control circuitry in place, in which said cable housing further comprises a cover plate secured on said reel to sealedly cover said receiving chamber, a gasket being positioned between said cover plate and said front surface of said reel to ensure sealed connection.

9. A ground water alert device, as recited in claim 1, in which aid cable supporter comprises a stop cap, having an U-shaped cross section, which fits over said top end of said monitoring pipe, said stop cap having a top surface which provides an inlet hole having a diameter larger than a diameter of said enlarged stopper and a diameter said water sensor, a stopping hole having a diameter larger than said cable member and smaller than a diameter of said enlarged stopper, and a slit which has a width slightly larger than said diameter of said cable member and is extended between said inlet hole and said stopping hole.

10. A ground water alert device, as recited in claim 4, in which aid cable supporter comprises a stop cap, having an U-shaped cross section, which fits over said top end of said monitoring pipe, said stop cap having a top surface which provides an inlet hole having a diameter larger than a diameter of said enlarged stopper and a diameter said water sensor, a stopping hole having a diameter larger than said cable member and smaller than a diameter of said enlarged stopper, and a slit which has a width slightly larger than said diameter of said cable member and is extended between said inlet hole and said stopping hole.

11. A ground water alert device, as recited in claim 8, in which aid cable supporter comprises a stop cap, having an U-shaped cross section, which fits over said top end of said monitoring pipe, said stop cap having a top surface which provides an inlet hole having a diameter larger than a diameter of said enlarged stopper and a diameter said water sensor, a stopping hole having a diameter larger than said cable member and smaller than a diameter of said enlarged stopper, and a slit which has a width slightly larger than said diameter of said cable member and is extended between said inlet hole and said stopping hole.

12. A ground water alert device, as recited in claim 1, in which said control circuitry further comprises a buzzer switch electrically connected to said function switch and a DC power source, a buzzer being connected in series with said buzzer switch and said DC power source.

13. A ground water alert device, as recited in claim 1, in which said resistor is a 2.2k resistor.

14. A ground water alert device, as recited in claim 12, in which said resistor is a 2.2k resistor.

15. A ground water alert device, as recited in claim 4, in which said control circuitry further comprises a buzzer switch electrically connected to said function switch and a DC power source, a buzzer being connected in series with said buzzer switch and said DC power source.

16. A ground water alert device, as recited in claim 15, in which said resistor is a 2.2k resistor.

17. A ground water alert device, as recited in claim 8, in which said control circuitry further comprises a buzzer switch electrically connected to said function switch and a DC power source, a buzzer being connected in series with said buzzer switch and said DC power source.

18. A ground water alert device, as recited in claim 17, in which said DC power source comprises a battery, wherein a battery holder is provided within said receiving chamber to electrically connect and hold said battery in position.

19. A ground water alert device, as recited in claim 18, in which said resistor is a 2.2k resistor.

20. A ground water alert device, as recited in claim 11, in which said control circuitry further comprises a buzzer switch electrically connected to said function switch and a DC power source, a buzzer being connected in series with said buzzer switch and said DC power source, said DC power source comprising a battery, wherein a battery holder is provided within said receiving chamber to electrically connect and hold said battery in position, and that said resistor is a 2.2k resistor.

* * * * *